United States Patent
Park

(10) Patent No.: US 8,116,215 B2
(45) Date of Patent: Feb. 14, 2012

(54) METHOD AND APPARATUS FOR DISCRIMINATING TYPE OF PACKET LOSS

(75) Inventor: Min-kyu Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 11/438,446

(22) Filed: May 23, 2006

(65) Prior Publication Data

US 2007/0019564 A1 Jan. 25, 2007

(30) Foreign Application Priority Data

Jun. 14, 2005 (KR) .................. 10-2005-0051138

(51) Int. Cl.
*G01R 31/08* (2006.01)
(52) U.S. Cl. .................................. 370/252
(58) Field of Classification Search ....... 370/229–238.1, 370/252, 356, 389, 391–392, 395.2–395.43, 370/400–401, 412–418, 428, 468, 477, 508, 370/902, 61; 709/223–226, 229, 232–234, 709/238–242
See application file for complete search history.

(56) References Cited

U.S. PATENT DOCUMENTS

| | | | | |
|---|---|---|---|---|
| 5,166,894 A * | 11/1992 | Saito | ............................ | 708/200 |
| 5,434,860 A * | 7/1995 | Riddle | ............................ | 370/232 |
| 5,577,028 A * | 11/1996 | Chugo et al. | ............................ | 370/409 |
| 5,581,544 A * | 12/1996 | Hamada et al. | ............................ | 370/253 |
| 5,872,771 A * | 2/1999 | Park et al. | ............................ | 370/252 |
| 6,452,950 B1 * | 9/2002 | Ohlsson et al. | ............................ | 370/516 |
| 6,549,517 B1 * | 4/2003 | Aweya et al. | ............................ | 370/236.1 |
| 7,065,482 B2 * | 6/2006 | Shorey et al. | ............................ | 709/224 |
| 7,197,014 B2 * | 3/2007 | Katsuyama et al. | ............................ | 370/252 |
| 2005/0007955 A1 * | 1/2005 | Schrodi | ............................ | 370/230 |
| 2005/0021830 A1 * | 1/2005 | Urzaiz et al. | ............................ | 709/234 |

FOREIGN PATENT DOCUMENTS

| | | |
|---|---|---|
| JP | 2001-160824 A | 6/2001 |
| JP | 2003-229908 A | 8/2003 |
| KR | 10-2000-0050599 A | 8/2000 |
| WO | WO 03/088554 A1 | 10/2003 |

OTHER PUBLICATIONS

Wang Haitao et al., "Performance of TCP in Ad Hoc Network and Its Improvement Policies", Journal of Communication and Computer, Feb. 2, 2005, pp. 66-70, vol. 2, No. 2, Serial. No. 3, China.
Communication dated Jul. 15, 2011, issued in counterpart European Patent Application No. 06115046.2.
Song Cen et al., "End-to-End Differentiation of Congestion and Wireless Losses," IEEE/ACM Transactions on Networking, Oct. 5, 2003, 703-717, vol. 11, No. 5, New York, USA.

(Continued)

*Primary Examiner* — Ricky Ngo
*Assistant Examiner* — Phuongchau B Nguyen
(74) *Attorney, Agent, or Firm* — Sughrue Mion, PLLC

(57) ABSTRACT

A method and apparatus for discriminating the type of packet loss occurring in wireless transmission are provided. The method includes calculating an average arrival interval of packets received during a time period and discriminating the type of packet loss for a lost packet among the packets based on a difference between the calculated average arrival interval and a reference average arrival interval.

21 Claims, 6 Drawing Sheets

OTHER PUBLICATIONS

Fan Yang et al., "Bit Allocation for Scalable Video Streaming Over Mobile Wireless Internet," INFOCOM 2004, Twenty-Third Annual Joint Conference of the IEEE Computer and Communications Societies, Mar. 7, 2004, 2142-2151, vol. 3, IEEE, Piscataway, NJ, USA.

Min Kyu Park et al., "A Statistical Method of Packet Loss Type Discrimination in Wired-Wireless Networks," Consumer Communications and Networking Conference 2006, Jan. 8, 2006, 458-462, vol. 1, IEEE, Piscataway, NJ, USA.

Dhiman Barman et al., "Effectiveness of Loss Labeling in Improving TCP Performance in Wired/Wireless Networks," Proceedings of the 10TH IEEE International Conference on Network Protocols, Nov. 12, 2002, 2-11, IEEE, Piscataway, NJ, USA.

* cited by examiner

METHOD AND APPARATUS FOR DISCRIMINATING TYPE OF PACKET LOSS

CROSS-REFERENCE TO RELATED PATENT APPLICATION

This application claims priority from Korean Patent Application No. 10-2005-0051138, filed on Jun. 14, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to discriminating a type of packet loss occurring in wireless transmission, and more particularly, to determining whether the packet loss is wireless loss or congestion loss.

2. Description of the Related Art

When a high-bitrate video stream is transmitted over a wireless local area network (LAN) complying with Institute of Electrical and Electronics Engineers (IEEE) 802.11, the transmission is generally performed in such a way to appropriately cope with a loss that may occur during the transmission. For example, if wireless loss occurs during the transmission of a high-bitrate video stream, the high-bitrate video stream is transmitted after an error correction code is added to the high-bitrate video stream. On the other hand, if congestion loss occurs during the transmission of a high-bitrate video stream, the high-bitrate video stream is transmitted after the bitrate of the high-bitrate video stream is reduced.

FIGS. 1A and 1B illustrate a related art single stream transmitting/receiving system.

Referring to FIGS. 1A and 1B, the related art single stream transmitting/receiving system includes a transmitter 11, a router 12, an access point (AP) 13, and a receiver 14.

The transmitter 11 transmits packets corresponding to a single stream through the Internet in a wired manner. Thus, the transmitter 11 may be regarded as a server. The router 12 receives packets from the transmitter 11 and routes the packets to their destination, i.e., the receiver 14, based on the Internet protocol (IP) addresses of the packets. The AP 13 receives packets from the router 12, buffers the received packets, and continuously transmits the buffered packets through an IEEE 802.11 wireless LAN in a wireless manner. Thus, the AP 13 may be regarded as a base station including both a wired communication module and a wireless communication module. The receiver 14 receives packets from the AP 13. Thus, the receiver 14 may be regarded as a client.

First, wireless loss illustrated in FIG. 1A will be considered.

The transmitter 11 transmits packets 1 through 3 in a wired manner. The router 12 receives the packets 1 through 3 from the transmitter 11 and routes the packets 1 through 3. The AP 13 receives the packets 1 through 3 from the router 12 and transmits the packets 1 through 3 in a wireless manner. At this time, during the wireless transmission of the packets 1 through 3 from the AP 13 to the receiver 14, the packet 2 is lost due to 2.4 GHz microwaves radiated from a microwave oven. As a result, the receiver 14 only receives the packets 1 and 3.

Such a case is called wireless loss. In this case, since the packet 2 is lost while being transmitted from the AP 13 to the receiver 14 in a wireless manner, the arrival interval between the packets 1 and 3 is 2T when a packet interval is T.

Next, congestion loss illustrated in FIG. 1B will be considered.

The transmitter 11 transmits packets 1 through 3 in a wired manner. At this time, during the transmission of the packets 1 through 3 from the transmitter 11 to the router 12, the transmission of the packet 2 is congested due to a difference between bandwidths of the transmitter 11 and the router 12 and thus the packet 2 is lost. As a result, the router 12 only receives the packets 1 and 3 and routes the packets 1 and 3. The AP 13 receives the packets 1 and 3 from the router 12 and transmits the packets 1 and 3 in a wireless manner. The receiver 14 receives the packets 1 and 3.

Such a case is called congestion loss. In this case, since the packet 2 is lost while being transmitted from the transmitter 11 to the router 12 in a wired manner and the packets 1 and 3 are buffered by the AP 13, the arrival interval between the packets 1 and 3 is T when a packet interval is T.

According to a related art method for discriminating the type of packet loss, the arrival interval between packets is measured. If the measured arrival interval satisfies $(N+1)\text{Tmin} \leq \text{arrival interval} < (N+2)\text{Tmin}$, the type of packet loss is determined to be wireless loss. Otherwise, the type of packet loss is determined to be congestion loss. Tmin indicates the minimum arrival interval among the measured arrival intervals and N indicates the number of lost packets. Thus, in the above example, Tmin is T and N is 1.

The related art method for discriminating the type of packet loss is based on the following assumptions. First, packets correspond to a single stream having a constant bitrate. Second, each of the packets has the same size. Third, the AP 13 continuously transmits the packets at regular intervals. Fourth, the bandwidth of wired transmission is much larger than that of wireless transmission. Fifth, the router 12 adopts a drop mechanism to drop a packet when packet transmission is congested.

However, the related art method for discriminating the type of packet loss is not suitable for discriminating the type of packet loss for packets corresponding to a plurality of streams such as multi-streams, in particular, multi-video streams. This is because an interval between packets corresponding to one of the multi-streams is not constant due to the intervention of packets corresponding to another one of the multi-streams. Moreover, an interval between packets corresponding to one of multi-video streams may not be constant due to the fluctuation of an effective bandwidth and changes in the transmission bitrate of transmitters.

SUMMARY OF THE INVENTION

The present invention provides a method and apparatus for discriminating the type of packet loss for packets corresponding to multi-streams in addition to a single stream.

The present invention also provides a computer-readable recording medium having recorded thereon a program for implementing the method.

According to an aspect of the present invention, there is provided a method for discriminating the type of packet loss. The method includes calculating an average arrival interval of packets received during a time period and discriminating the type of packet loss for a lost packet among the packets based on a difference between the calculated average arrival interval and a reference average arrival interval.

According to another aspect of the present invention, there is provided an apparatus for discriminating the type of packet loss. The apparatus includes a calculating unit which calculates an average arrival interval of packets received during a time period and a discriminating unit which discriminates the type of packet loss for a lost packet among the packets based on a difference between the average arrival interval calculated by the calculating unit and a reference average arrival interval.

According to still another aspect of the present invention, there is provided a computer-readable recording medium having recorded thereon a program for implementing a method for discriminating the type of packet loss. The method includes calculating an average arrival interval of packets received during a time period and discriminating the type of packet loss for a lost packet among the packets based on a difference between the calculated average arrival interval and a reference average arrival interval.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Figure 1A:
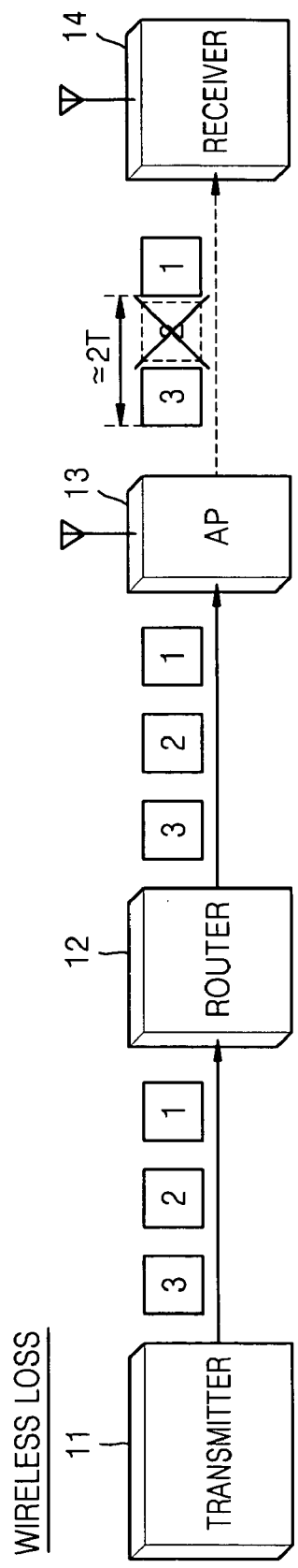
FIGS. 1A and 1B illustrate a related art single stream transmitting/receiving system.
Figure 1B:
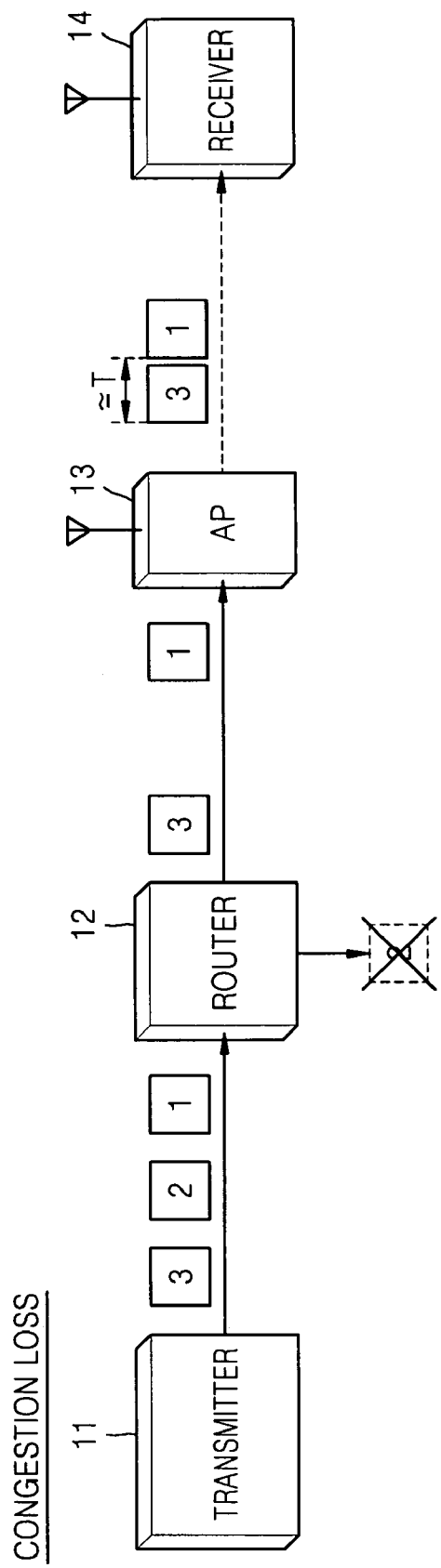
Figure 2:
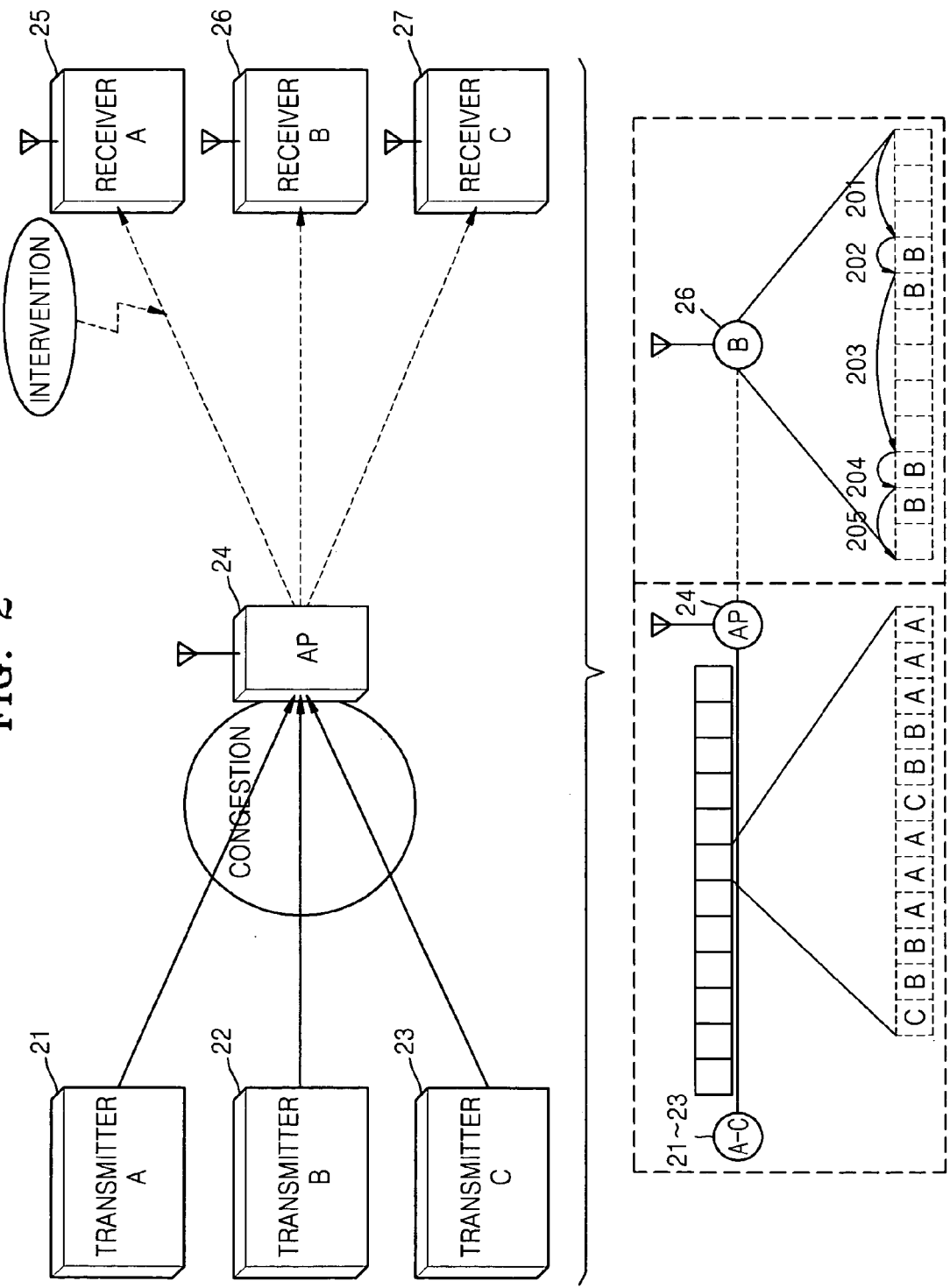
FIG. 2 illustrates a multi-stream transmitting/receiving system according to an exemplary embodiment of the present invention.

FIG. 2 illustrates a multi-stream transmitting/receiving system according to an exemplary embodiment of the present invention.

Referring to FIG. 2, the multi-stream transmitting/receiving system includes transmitters A, B, and C 21 through 23, an access point (AP) 24, and receivers A, B, and C 25 through 27.

Each of the transmitters A, B, and C 21 through 23 transmits packets A, packets B, and packets C corresponding to multi-streams through the Internet in a wired manner. Thus, the transmitters A, B, and C 21 through 23 may be regarded as servers. The AP 24 receives packets from the transmitters A, B, and C 21 through 23, buffers the packets, and continuously transmits the buffered packets through an IEEE 802.11 wireless LAN in a wireless manner. Thus, the AP 24 may be regarded as a base station including both a wired communication module and a wireless communication module. The receivers A, B, and C 25 through 27 receive packets from the AP 24. Thus, the receivers A, B, and C 25 through 27 may be regarded as clients.

Here, the number of types of streams included in multi-streams is equal to the number of transmitters. In addition, packets continuously transmitted from the AP 24 to the receivers A, B, and C 25 through 27 correspond to multi-streams including streams destined to the receiver A 25, streams destined to the receiver B 26, and streams destined to the receiver C 27.

The multi-stream transmitting/receiving system according to the current exemplary embodiment of the present invention is based on the following assumptions. First, each of packets has the same size. Second, the AP 24 continuously transmits packets corresponding to multi-streams at regular intervals. However, packets corresponding to one of the multi-streams may be transmitted at irregular intervals. Third, the bandwidth of wired transmission is much larger than that of wireless transmission. Fourth, the AP 24 adopts a drop mechanism to drop a packet when packet transmission is congested.

Under the assumptions stated above, some of packets corresponding to multi-streams may be lost due to 2.4 GHz microwaves radiated from a microwave oven while being transmitted from the AP 24 to the receivers A, B, and C 25 through 27 in a wireless manner. In addition, when the transmitters A, B, and C 21 through 23 simultaneously transmit packets, the transmission of the packets is congested during the receipt of the packets at the AP 24. As a result, some of the packets may be lost. The former is called wireless loss and the latter is called congestion loss.

Figure 3:
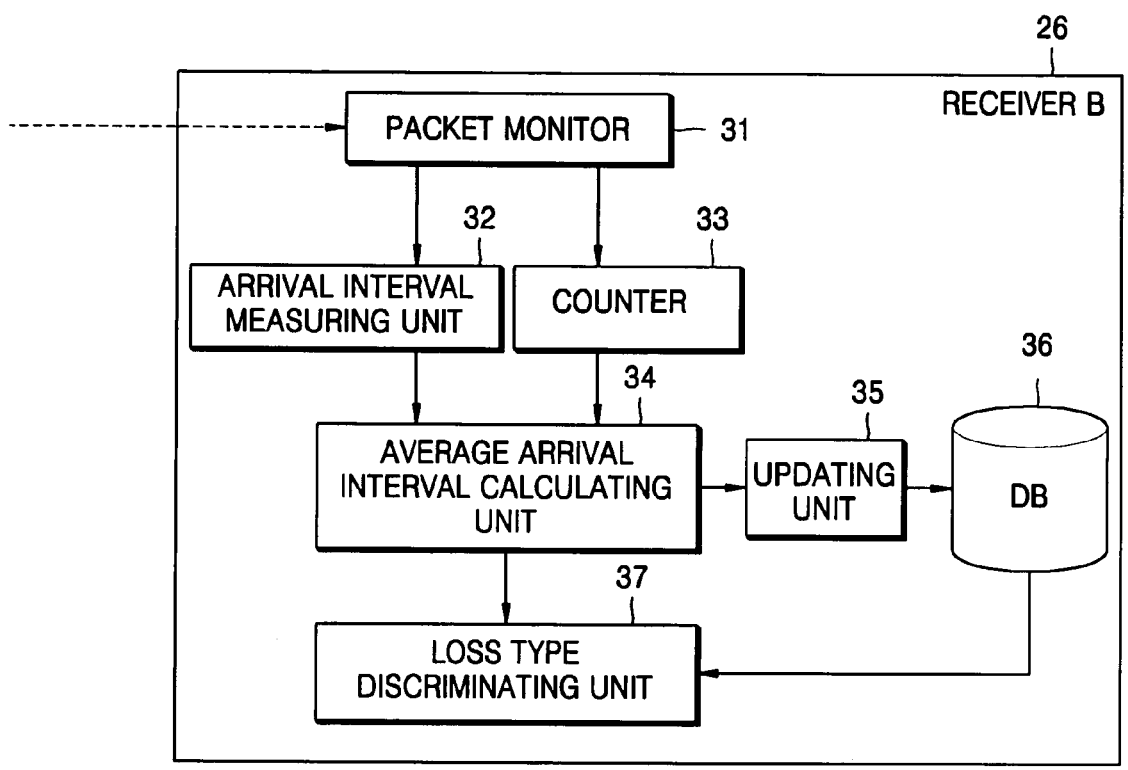
FIG. 3 is a block diagram of an apparatus which discriminates the type of packet loss according to an exemplary embodiment of the present invention.

FIG. 3 is a block diagram of an apparatus for discriminating the type of packet loss according to an exemplary embodiment of the present invention. Referring to FIG. 3, the apparatus for discriminating the type of packet loss according to the current exemplary embodiment of the present invention is mounted in the receiver B 26 illustrated in FIG. 2 and includes a packet monitor 31, an arrival interval measuring unit 32, a counter 33, an average arrival interval calculating unit 34, an updating unit 35, a database 36, and a loss type discriminating unit 37.

The packet monitor 31 monitors the packets B corresponding to streams destined to the receiver B 26 among packets received from the AP 24 during a predetermined length of monitoring period.

The arrival interval measuring unit 32 measures an interval 201 between the start of a monitoring period and the arrival of the first packet B received during the monitoring period, arrival intervals 202, 203, and 204 between the packets B received during the monitoring period, and an interval 205 between the arrival of the last packet B received during the monitoring period and the end of the monitoring period by referring to the arrival times of the packets B from monitoring information of the packet monitor 31.

The counter 33 counts the number of packets B received during the monitoring period by referring to the sequence numbers of the packets B from the monitoring information of the packet monitor 31. The counter 33 also counts the number of lost packets B among the packets B received during the monitoring period by referring to the numbers of the packets B from the monitoring information of the packet monitor 31. When there is no lost packet B among the packets B received during the monitoring period, the received packets B have consecutive sequence numbers. When there is a lost packet B among the packets B received during the monitoring period, the received packets B have inconsecutive sequence numbers without the sequence number of the lost packet B. In other words, when the sequence numbers of the received packets B are inconsecutive, the counter 33 increases the count value of lost packets B by a result of subtracting 1 from a difference between sequence numbers.

The average arrival interval calculating unit 34 calculates a sum of the intervals 201 through 205 measured by the arrival interval measuring unit 32 and divides the calculated sum by a result of adding 1 to a sum of count values of the counter 33, i.e., a result of adding 1 to a sum of the number of packets B received during the monitoring period and the number of lost packets B among the packets B received during the monitoring period, thereby calculating an average arrival interval. This can be expressed as follows.

$$Tav = \sum_{i=1}^{Na} Ti/(Np+1), \quad (1)$$

where Tav indicates an average arrival interval, Ti indicates the ith arrival interval Na indicates the number of arrival intervals, and Np indicates the number of packets.

If the count value of the counter 33 indicates that there is no lost packet among the packets B received during the monitoring period, the average arrival interval calculating unit 34 outputs the calculated average arrival interval to the updating unit 35. If the count value of the counter 33 indicates there is a lost packet among the packets B received during monitoring period, the average arrival interval calculating unit 34 outputs the calculated average arrival interval to the loss type discriminating unit 37.

The updating unit 35 updates a reference average arrival interval stored in the database 36 with the average arrival interval input from the average arrival interval calculating unit 34. In other words, the updating unit 35 eliminates an existing reference average arrival interval from the database 36 and stores an average arrival interval input from the average arrival interval calculating unit 34 in the database 36. In this way, the updating unit 35 updates a reference average arrival interval with an average arrival interval that is most recent statistically based on the mobility of an average arrival interval due to the fluctuation of a valid bandwidth and changes in the transmission bitrate of transmitters in multi-streams.

The database 36 stores a reference average arrival interval according to the update of the updating unit 35. Here, the reference average arrival interval indicates an average arrival interval during a monitoring period when there is no lost packet among packets B received during the monitoring period.

The loss type discriminating unit 37 discriminates the type of packet loss for a lost packet among the packets B received during the monitoring period based on a difference between the average arrival interval calculated by the average arrival interval calculating unit 34 and the reference average arrival interval stored in the database 36.

More specifically, if the average arrival interval calculated by the average arrival interval calculating unit 34 is not smaller than the reference average arrival interval stored in the database 36, the loss type discriminating unit 37 determines that a packet B among the packets B received during the monitoring period is lost due to its wireless transmission, i.e., the packet loss type of the packet B is wireless loss. If the average arrival interval calculated by the average arrival interval calculating unit 34 is smaller than the reference average arrival interval stored in the database 36, the loss type discriminating unit 37 determines that a packet B among the packets B received during the monitoring period is lost due to the congestion of transmission, i.e., the packet loss type of the packet B is congestion loss.

Figure 4:
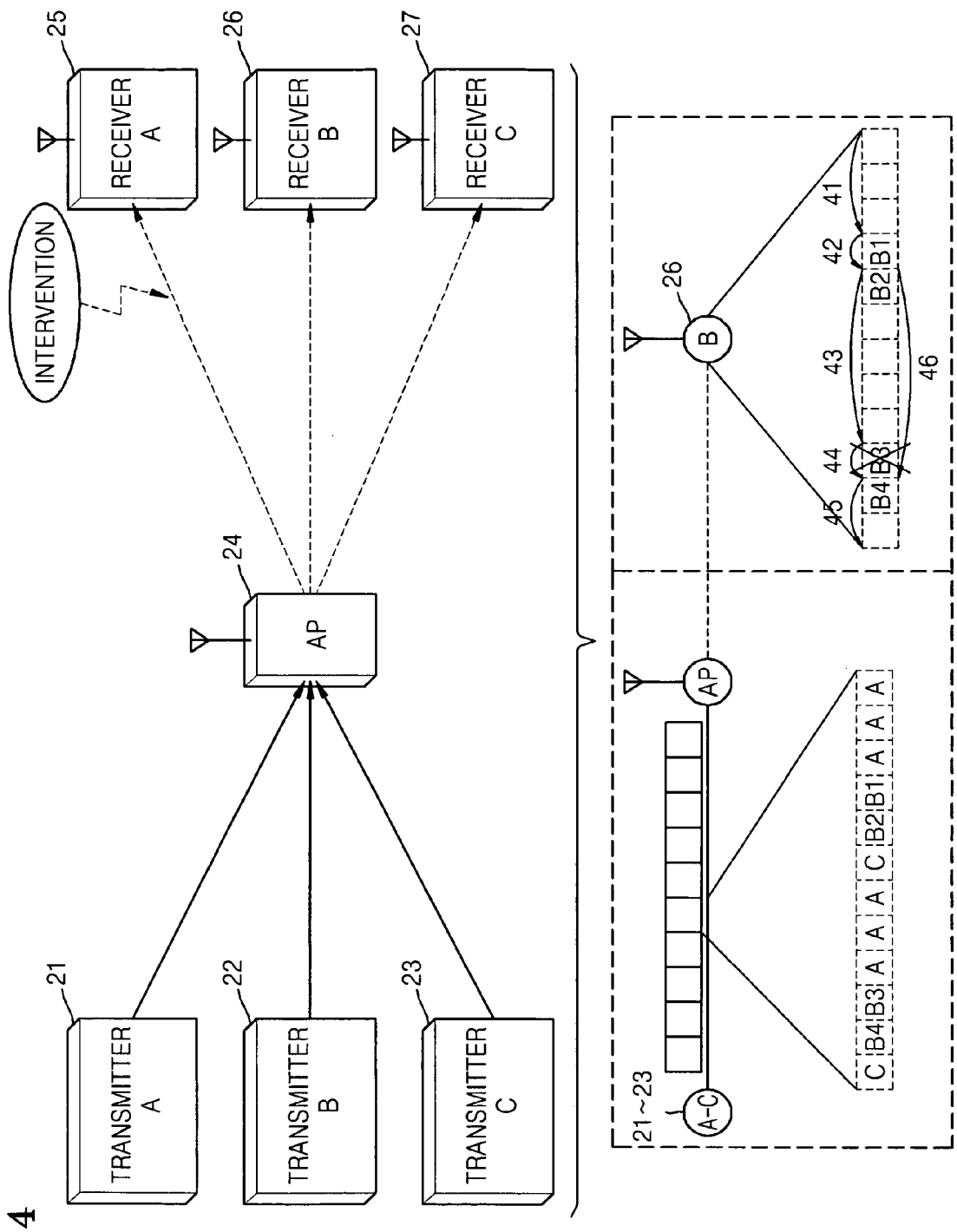
FIG. 4 illustrates an example where wireless loss is determined using the apparatus which discriminates the type of packet loss illustrated in FIG. 3.

FIG. 4 illustrates an example where wireless loss is determined using the apparatus which discriminates the type of packet loss illustrated in FIG. 3.

Referring to FIG. 4, the AP 24 receives three packets A corresponding to a stream destined to the receiver A 25, two packets B corresponding to a stream destined to the receiver B 26, one packet C corresponding to a stream destined to the receiver C in a wired manner and transmits those packets to the receiver A, B, and C 25 through 27 in a wireless manner.

First, a description will be made regarding a case where packet loss does not occur when packets depart from the transmitters A, B, and C 21 through 23 and arrive at the receivers A, B, and C 25 through 27 through the AP 24.

The packet monitor 31 monitors the arrival of packets B1 through B4 corresponding to streams destined to the receiver B 26 among packets received from the AP 24 during the monitoring period.

The arrival interval measuring unit 32 measures an interval 3T 41 between the start of the monitoring period and the arrival of the packet B1, an arrival interval T 42 between the packet B1 and the packet B2, an arrival interval 5T 43 between the packet B2 and the packet B3, an arrival interval T 44 between the packet B3 and the packet B4, and an interval 2T 45 between the arrival of the packet B4 and the end of the monitoring period by referring to the arrival times of the packets B1 through B4 from the monitoring information of the packet monitor 31.

The counter 33 counts the number of packets B1 through B4 received during the monitoring period by referring to the sequence numbers of the packets B1 through B4 from the monitoring information of the packet monitor 31. Thus, the count value of the counter 33 is 4. The counter 33 also counts the number of lost packets B among the packets B1 through B4 received during the monitoring period by referring to the sequence numbers of the packets B1 through B4. Thus, the count value of the counter 33 is 0.

The average arrival interval calculating unit 34 calculates a sum of the intervals 3T 41, T 42, 5T 43, T 44, and 2T 45 measured by the arrival interval measuring unit 32 and divides the calculated sum by 5 that is a result of adding 1 to a sum of the count values 4 and 0 of the counter 33, thereby calculating an average arrival interval of 12T/5. Since the count value of the counter 33 indicates that there is no lost packet among the packets B received during the monitoring period, the average arrival interval calculating unit 34 outputs the calculated average arrival interval of 12T/5 to the updating unit 35.

The updating unit 35 updates the reference average arrival interval stored in the database 36 with the average arrival interval of 12T/5 input from the average arrival interval calculating unit 34.

Next, a description will be made regarding a case where some of packets, i.e., the packet B3 is lost due to 2.4 GHz microwaves radiated from a microwave oven while being transmitted from the AP 24 to the receivers A, B, and C 25 through 27 in a wireless manner.

The packet monitor 31 monitors the arrival of the packets B1, B2, and B4 corresponding to streams destined to the receiver B 26 among the packets received from the AP 24 during the monitoring period.

The arrival interval measuring unit 32 measures an interval 3T 41 between the start of the monitoring period and the arrival of the packet B1, an arrival interval T 42 between the packet B1 and the packet B2, an arrival interval 6T 46 between the packet B2 and the packet B4, and an interval 2T 45 between the arrival of the packet B4 and the end of the monitoring period by referring to the arrival times of the packets B1, B2, and B4 from the monitoring information of the packet monitor 31.

The counter 33 counts the number of packets B1, B2, and B4 received during the monitoring period by referring to the sequence numbers of the packets B1, B2, and B4 from the monitoring information of the packet monitor 31. Thus, the count value of the counter 33 is 3. The counter 33 counts the number of lost packet B3 among the packets B received during the monitoring period by referring to the sequence numbers of the packets B. Thus, the count value of the counter 33 is 1.

The average arrival interval calculating unit 34 calculates a sum of the intervals 3T 41, T 42, 5T 43, T 44, and 2T 45 measured by the arrival interval measuring unit 32 and divides the calculated sum by 5 that is a result of adding 1 to a sum of the count values 3 and 1 of the counter 33, thereby calculating an average arrival interval of 12T/5. Since the count value of the counter 33 indicates that there is a lost packet among the packets B received during the monitoring period, the average arrival interval calculating unit 34 outputs the calculated average arrival interval of 12T/5 to the loss type discriminating unit 37.

Since the average arrival interval of 12T/5 calculated by the average arrival interval calculating unit 34 is equal to the reference average arrival interval of 12T/5 stored in the database 36, the loss type discriminating unit 37 determines that a packet B3 among the packets B received during the monitoring period is lost due to its wireless transmission, i.e., the packet loss type of the packet B3 is wireless loss.

Figure 5:
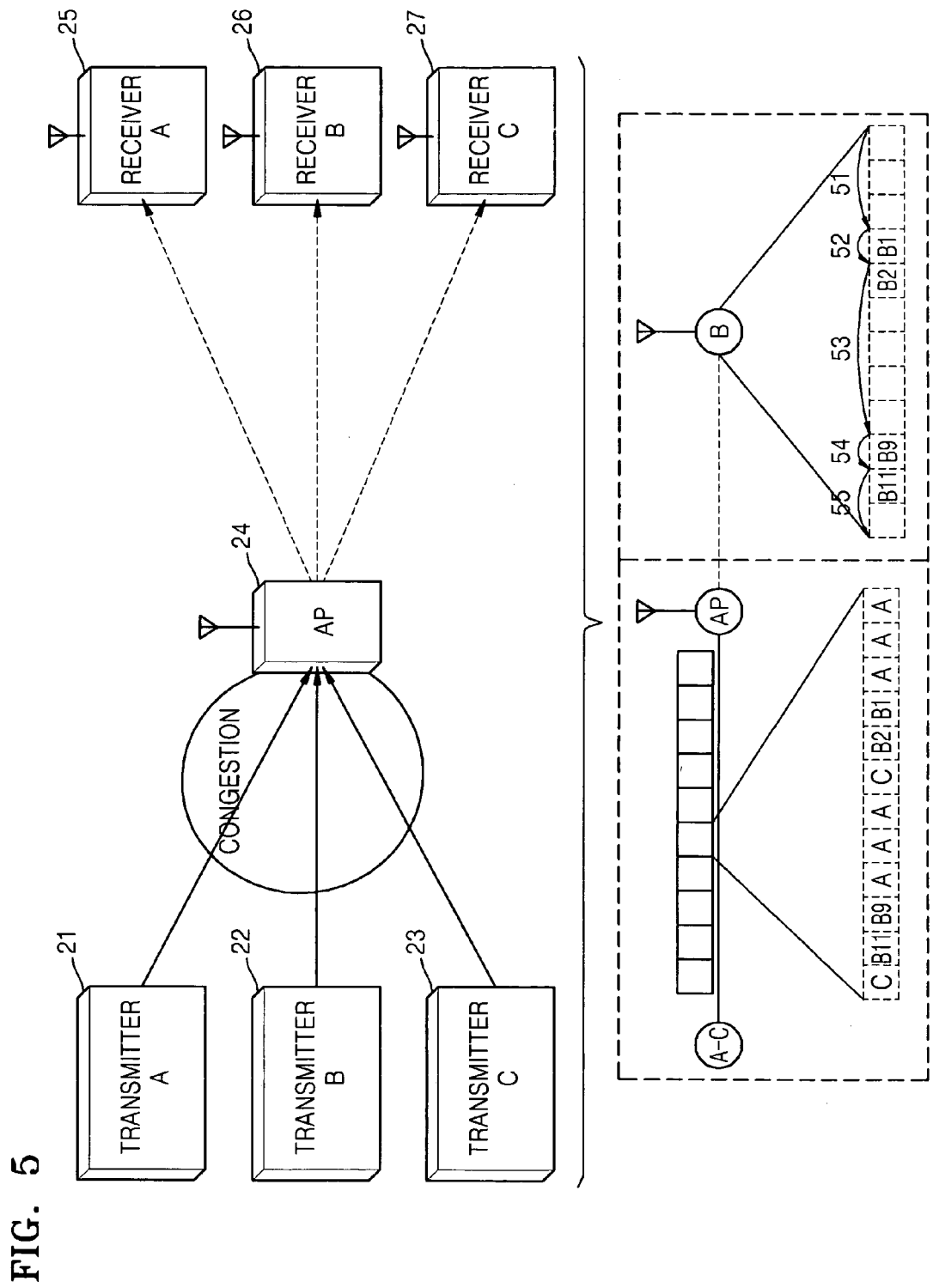
FIG. 5 illustrates an example where congestion loss is determined using the apparatus which discriminates the type of packet loss illustrated in FIG. 3.

FIG. 5 illustrates an example where congestion loss is determined using the apparatus which discriminates the type of packet loss illustrated in FIG. 3.

Referring to FIG. 5, the AP 24 receives three packets A corresponding to a stream destined to the receiver A 25, two packets B corresponding to a stream destined to the receiver B 26, one packet C corresponding to a stream destined to the receiver C in a wired manner and transmits those packets to the receiver A, B, and C 25 through 27 in a wireless manner.

When the entire bandwidth of the transmitters A, B, and C 21 through 23 is larger than that of the AP 24, if the transmitters A, B, and C 21 through 23 simultaneously transmit packets, the transmission of the packets is congested during the receipt of the packets at the AP 24. Hereinafter, a case where some of the packets, i.e., packets B3 through B8 are lost due to the congestion of transmission will be described.

The packet monitor 31 monitors the arrival of packets B1, B2, B9, and B11 corresponding to streams destined to the receiver B 26 among the packets received from the AP 24 during the monitoring period.

The counter 33 counts the number of packets B1, B2, B9, and B11 received during the monitoring period by referring to the sequence numbers of the packets B1, B2, B9, and B11 from the monitoring information of the packet monitor 31. Thus, the count value of the counter 33 is 4. The counter 33 counts the number of lost packets B3 through B8 and the packet B10 among the packets B1 through B11 received during the monitoring period by referring to the sequence numbers of the packets B from the monitoring information of the packet monitor 31. Thus, the count value of the counter 33 is 7.

The average arrival interval calculating unit 34 calculates a sum of the intervals 3T 51, T 52, 5T 53, T 54, and 2T 55 measured by the arrival interval measuring unit 32 and divides the calculated sum by 2 that is a result of adding 1 to a sum of the count values 4 and 7 of the counter 33, thereby calculating an average arrival interval of 12T/12=T. Since the count value of the counter 33 indicates that there is a lost packet among the packets B received during the monitoring period, the average arrival interval calculating unit 34 outputs the calculated average arrival interval of T to the loss type discriminating unit 37.

Since the average arrival interval of T calculated by the average arrival interval calculating unit 34 is smaller than the reference average arrival interval of 12T/5 stored in the database 36, the loss type discriminating unit 37 determines that the packets B3 through B8 and the packet B10 among the packets B received during the monitoring period are lost due to the congestion of transmission, i.e., the packet loss type of the packets B3 through B8 and the packet B10 is congestion loss.

Figure 6:
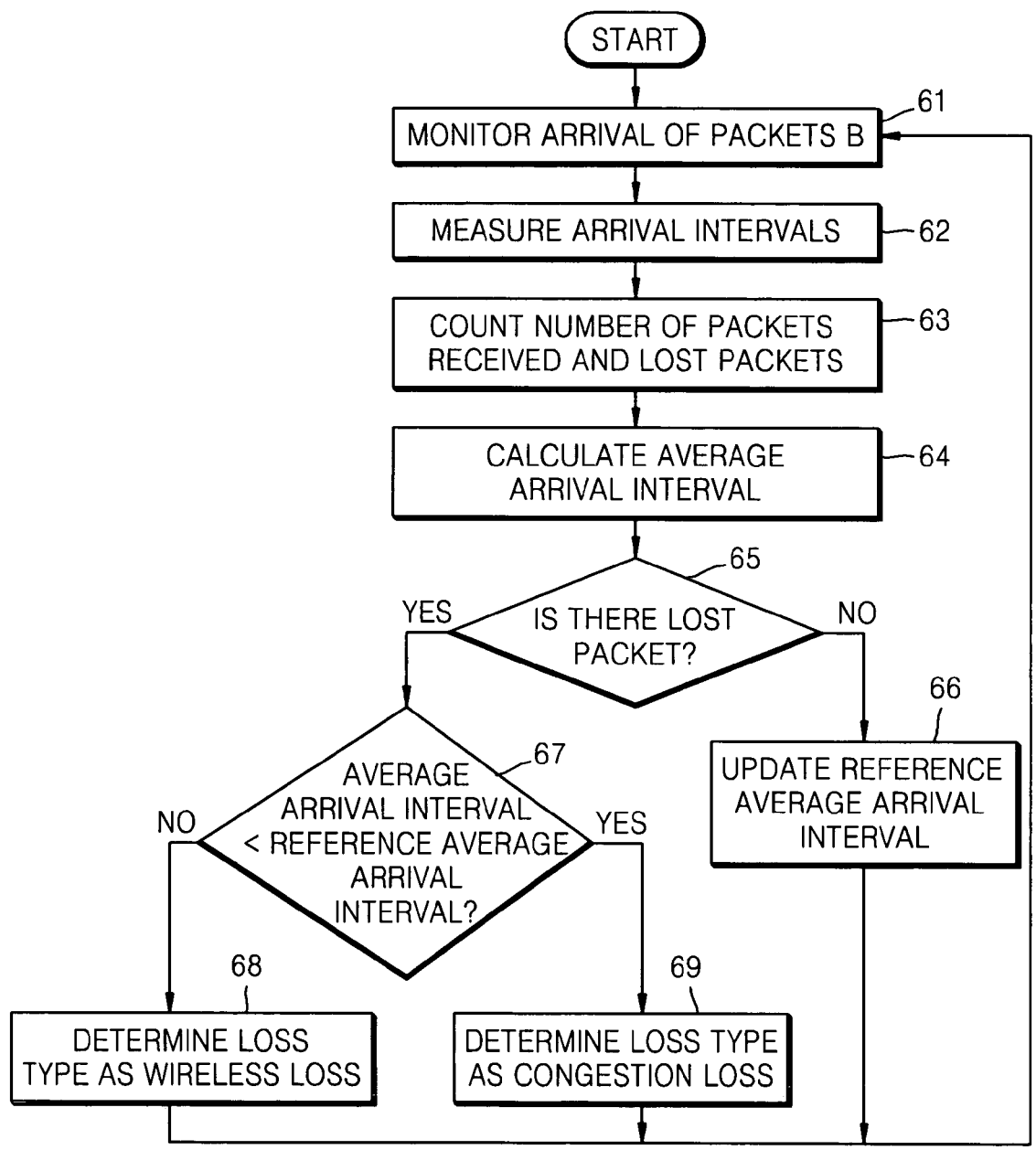
FIG. 6 is a flowchart illustrating a method for discriminating the type of packet loss according to an exemplary embodiment of the present invention.

FIG. 6 is a flowchart illustrating a method for discriminating the type of packet loss according to an exemplary embodiment of the present invention.

Referring to FIG. 6, the method for discriminating the type of packet loss includes operations processed in time series by the apparatus which discriminates the type of packet loss of the receiver B 26 illustrated in FIG. 3. Thus, although not given in the following description, a description that is already made about the apparatus which discriminates the type of packet loss of the receiver B 26 is also applied to the method for discriminating the type of packet loss.

In operation 61, the receiver B 26 monitors the arrival of packets B corresponding to streams destined to the receiver B 26 among packets received from the AP 24 during a predetermined time period of monitoring.

In operation 62, the receiver B 26 measures an interval between the start of the monitoring period and the arrival of the first packet B received during the monitoring period, arrival intervals between packets B received during the monitoring period, and an interval between the arrival of the last packet B received during the monitoring period and the end of the monitoring period by referring to the arrival times of the packets B from monitoring information obtained in operation 61.

In operation 63, the receiver B 26 counts the number of packets B received during the monitoring period by referring to the sequence numbers of the packets B from the monitoring information obtained in operation 61. In operation 63, the receiver B 26 also counts the number of lost packets B among the packets B received during the monitoring period by referring to the sequence numbers of the packets B.

In operation 64, the receiver B 26 calculates a sum of the intervals measured in operation 62 and divides the calculated sum by a result of adding 1 to a sum of the count values obtained in operation 63, i.e., the number of arrival intervals that is a result of adding 1 to a sum of the number of packets B received during the monitoring period and the number of lost packets B among the packets B received during the monitoring period, thereby calculating an average arrival interval.

In operation 65, the receiver B 26 determines whether there is a lost packet among the packets B received during the monitoring period based on the count values obtained in operation 63.

In operation 66, if it is determined that there is no lost packet in operation 65, the receiver B 26 updates a reference average arrival interval with the average arrival interval calculated in operation 64 and goes back to operation 61.

In operation 67, if it is determined that there is a lost packet in operation 65, the receiver B 26 compares the average arrival interval calculated in operation 64 and a reference average arrival interval.

In operation 68, if the average arrival interval calculated in operation 64 is not smaller than the reference average arrival interval, the receiver B 26 determines that the packet B among the packets B received during the monitoring period is lost due to its wireless transmission, i.e., the packet loss type of the packet B is wireless loss, and goes back to operation 61.

In operation 69, if the average arrival interval calculated in operation 64 is smaller than the reference average arrival interval, the receiver B 26 determines that the packet B among the packets B received during the monitoring period is lost due to the congestion of transmission, i.e., the packet loss type of the packet B is congestion loss, and goes back to operation 61.

As described above, according to the present invention, the average arrival interval of packets received during a monitoring period is calculated and the type of packet loss is discriminated based on a difference between the calculated average arrival interval and a reference average arrival interval, thereby discriminating the type of packet loss for packets corresponding to multi-streams.

Moreover, according to the present invention, an important criterion can be provided in selecting a bitrate control mechanism for error correction and a congestion control mechanism for congestion settlement which are suitable for a current environment in a multi-video stream environment, thereby maximizing the throughput of video streaming.

Meanwhile, the exemplary embodiment of the present invention can be embodied as a program that can be implemented on computers and embedded devices and can be implemented on general-purpose digital computers executing the program using recording media that can be read by computers and embedded devices.

Examples of the recording media include magnetic storage media such as read-only memory (ROM), floppy disks, and hard disks, optical data storage devices such as CD-ROMs and digital versatile discs (DVD), and carrier waves such as transmission over the Internet.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A method for discriminating a type of packet loss, the method comprising:
    calculating by an average arrival calculating unit, an average arrival interval of a plurality of arrival intervals between successive packets received during a first time period based on a sum of a number of packets received during the first time period and a number of lost packets during the first time period; and
    discriminating by a loss type discriminating unit, the type of packet loss for a lost packet among the packets based on a difference between the calculated average arrival interval and a reference average arrival interval.

2. The method of claim 1, wherein if sequence numbers of packets, which are received during a second time period different from the first time period, are consecutive, the reference average arrival interval is equal to an average arrival interval of the packets received during the second time period.

3. The method of claim 2, further comprising:
    counting a number of lost packets among the packets received during the second time period by referring to sequence numbers of the packets received during the second time period; and
    updating the reference average arrival interval based on the average arrival interval of the packets received during the second time period if the count value indicates that there is no packet loss among the packets received during the second time period.

4. The method of claim 1, wherein the discriminating the type of packet loss comprises determining that packet loss occurs due to wireless transmission of the packets if the average arrival interval is not smaller than the reference average arrival interval, and determining that packet loss occurs due to congestion of the transmission of the packets if the average arrival interval is smaller than the reference average arrival interval.

5. The method of claim 1, wherein in the calculating the average arrival interval, the average arrival interval is calculated by dividing the sum of arrival intervals of the packets by a result of adding 1 to a sum of the number of packets received during the first time period and the number of lost packets.

6. The method of claim 5, further comprising measuring an interval between the start of the first time period and the arrival of the first packet received during the first time period, arrival intervals between the packets, and an interval between the arrival of the last packet received during the first time period and the end of the first time period,
    wherein in the calculating the average arrival interval, a sum of the measured intervals is calculated.

7. The method of claim 1, wherein in the calculating the average arrival interval, the average arrival interval of packets corresponding to one of multi-streams is calculated, and in the discriminating the type of packet loss, the type of packet loss for lost packets among the packets corresponding to the one of the multi-streams is discriminated.

8. The method of claim 1, further comprising monitoring arrivals of packets corresponding to streams destined to a specific receiver among packets received from an access point during the first time period.

9. The method of claim 1, wherein the average arrival interval of packets received during the first time period is calculated by determining an average of the plurality of arrival intervals that correspond to intervals existing between the receipt of respective successive packets of the packets received during the first time period.

10. An apparatus for discriminating a type of packet loss, the apparatus comprising:
    a calculating unit which calculates an average arrival interval of a plurality of arrival intervals between successive packets received during a first time period based on a sum of a number of packets received during the first time period and a number of lost packets during the first time period; and
    a discriminating unit which discriminates the type of packet loss for a lost packet among the packets received based on a difference between the average arrival interval calculated by the calculating unit and a reference average arrival interval.

11. The apparatus of claim 10, wherein when sequence numbers of packets, which are received during a second time period different from the first time period, are consecutive, the reference average arrival interval is equal to an average arrival interval of the packets received during the second time period.

12. The apparatus of claim 11, further comprising:
    a counter which counts the number of lost packets among the packets received during the second time period by referring to sequence numbers of the packets received during the second time period; and
    an updating unit which updates the reference average arrival interval with the average arrival interval of the packets received during the second time period if the count value of the counter indicates that there is no packet loss among the packets received during the second time period.

13. The apparatus of claim 12, further comprising a database which stores the updated reference average arrival interval updated by the updating unit.

14. The apparatus of claim 10, wherein the discriminating unit determines that packet loss occurs due to a wireless transmission of the packets received if the average arrival interval is not smaller than the reference average arrival interval and determines that packet loss occurs due to the congestion of the transmission of the packets received if the average arrival interval is smaller than the reference average arrival interval.

15. The apparatus of claim 10, wherein the calculating unit calculates the average arrival interval by dividing the sum of arrival intervals of the packets received by a result of adding 1 to a sum of the number of packets received during the first time period and the number of lost packets.

16. The apparatus of claim 15, further comprising a measuring unit which measures an interval between the start of the first time period and the arrival of a first packet received during the first time period, arrival intervals between the packets, and an interval between the arrival of the last packet received during the first time period and an end of the first time period, wherein the calculating unit calculates the sum of the arrival intervals measured by the measuring unit.

17. The apparatus of claim 10, wherein the calculating unit calculates an average arrival interval of packets corresponding to one of multi-streams and the discriminating unit discriminates the type of packet loss for lost packets among the packets corresponding to the one of the multi-streams.

18. The apparatus of claim 10, further comprising a packet monitor which monitors arrivals of packets corresponding to streams destined to a specific receiver among packets received from an access point during the first time period.

19. The apparatus of claim 10, wherein the calculating unit calculates the average arrival interval of packets received during the first time period by determining an average of the plurality of arrival intervals that correspond to intervals existing between the receipt of respective successive packets of the packets received during the first time period.

20. A non-transitory computer-readable recording medium having recorded thereon a program for implementing a method for discriminating a type of packet loss, the method comprising:
    calculating an average arrival interval of a plurality of arrival intervals between successive packets received during a time period based on a sum of a number of packets received during the time period and a number of lost packets during the first time period; and
    discriminating the type of packet loss for a lost packet among the packets based on a difference between the calculated average arrival interval and a reference average arrival interval.

21. The computer-readable recording medium of claim 20, wherein the average arrival interval of packets received during the first time period is calculated by determining an average of the plurality of arrival intervals that correspond to intervals existing between the receipt of respective successive packets of the packets received during the first time period.

* * * * *